L. HARIMAN.

Grain-Drill.

No. 29,691. Patented Aug. 21. 1860.

Witnesses:

Edwin R. King
Jas. St. Clair

Inventor:

L. Hariman
Knight Brothers
Attorneys.

AM. PHOTO-LITHO. CO. N.Y. (OSBORNE'S PROCESS.)

2 Sheets—Sheet 2.

L. HARIMAN.

Grain-Drill.

No. 29,691. Patented Aug. 21, 1860.

Witnesses:
Edwin W. Ring
Jno. W. Clute

Inventor:
L. Harriman
Knight Brothers
Attorneys

AM. PHOTO-LITHO. CO. N.Y. (OSBORNE'S PROCESS.)

UNITED STATES PATENT OFFICE.

LEONARD HARIMAN, OF ANDERSON, INDIANA.

IMPROVEMENT IN SEED-PLANTERS.

Specification forming part of Letters Patent No. 29,691, dated August 21, 1860.

*To all whom it may concern:*

Be it known that I, LEONARD HARIMAN, of Anderson, in the county of Madison and State of Indiana, have invented a certain new and useful Seeding-Machine; and I hereby declare the following to be a full and exact description of the same, reference being had to the accompanying drawings, making part of this specification, in which—

Figures 1, 2:
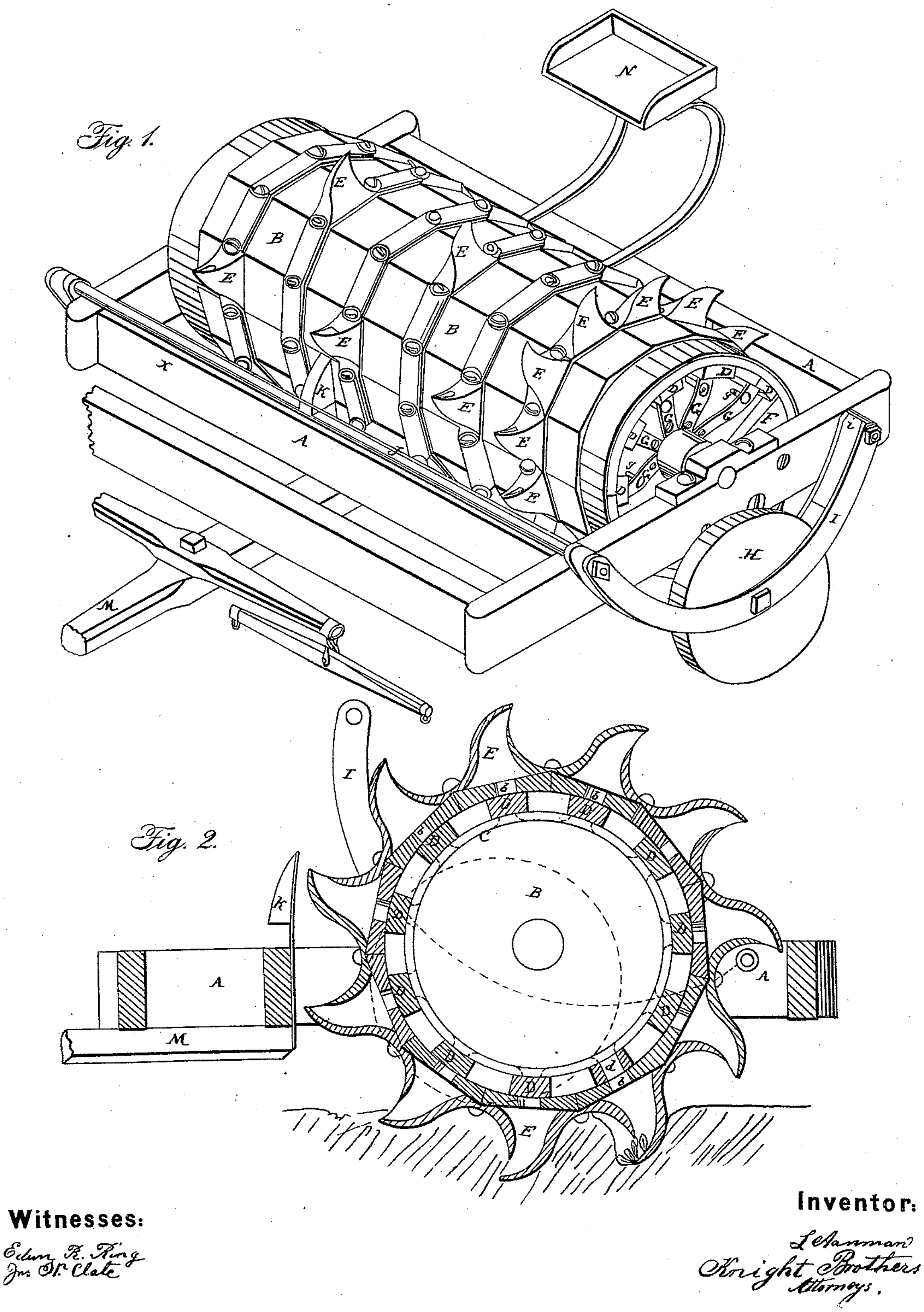
Figure 3:
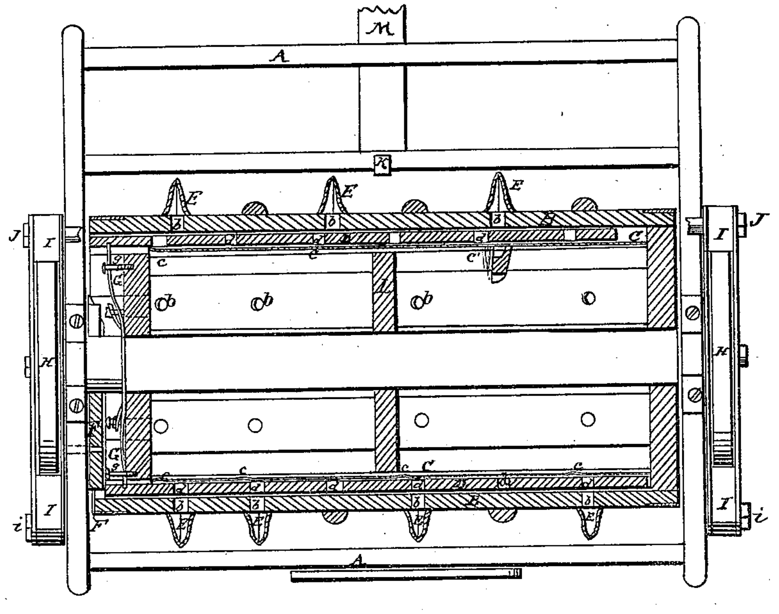

Figure 1 is a perspective view of the machine as adapted to be conveyed from place to place; Fig. 2, a transverse section of the same as adapted for planting; and Fig. 3, a plan in the latter position, exhibiting the cylinder and cam in horizontal section.

A represents a suitable frame, in which is journaled a hollow cylinder, B, composed of staves, each provided with a number of external apertures, *b*.

C is a casing of sheet metal, applied to the inner face of each stave and provided with apertures *c*, corresponding in longitudinal position with the apertures *b*, but differing latitudinally.

D are slides occupying a space between the stave B and casing C, and provided with apertures *d*, which are made to communicate alternately with the apertures *b* and *c*, as will be hereinafter explained.

E are seeding tubes or teeth, of peculiar construction, arranged around the cylinder in equidistant latitudinal belts, in positions corresponding with those of the apertures *b*, one tooth covering each of the said apertures.

F is a cam, which acts to press in each of the slides E at a proper period, and so retain it during a certain part of its revolution.

G are springs provided with temper-screws *g*, and employed to restore the slides to their outer position as soon as released by the cam F.

H are wheels journaled in levers I, having their fulcra at *i* in the main frame of the machine, and at their free ends connected by a rod, J.

K is a spring-catch adapted to hold the rod J when the latter is depressed, as shown in Fig. 1. In this position the machine is supported upon the wheels H, so as to elevate the cylinder B from the ground for the purpose of conveying the machine from place to place, turning at the end of the trough or adjusting the cylinder. When the machine is to be put in operation the rod J is released, allowing the cylinder to rest upon the ground, as shown in Fig. 2. The red lines exhibit the respective positions of the wheels H and frames I at this time.

L represents a transverse partition, of which any desired number may be used to divide the seed-box into compartments for sowing different kinds of grain, or for other purposes.

M represents the tongue by which the machine is drawn forward, and N a driver's seat.

The operation is as follows: The cylinder is supplied with the requisite quantity of grain, and on arriving at the part of the field where it is desired to commence sowing the catch K is retracted from the rod J, allowing the cylinder to descend to the position represented in Figs. 2 and 3, the tubes C penetrating the ground until the periphery of the cylinder rests upon the surface. The machine being now drawn forward, the cylinder rolls upon the ground, each slide as it comes in contact with the forward part of the cam F being pressed in so as to bring its aperture *d* into communication with the aperture *b*, communicating with the seeding-tooth, which results in depositing the grain contained in the aperture *d*. On passing the upper and rear end of the cam F the slide D is retracted by the spring G so as to bring its aperture *d* in connection with the inner aperture, *c*, through which it receives a fresh charge of seed, which is at the proper period deposited in the ground, as before explained. If preferred, the aperture *c* may be elongated, as shown at *c'*, in Fig. 3, a blind, P, provided with a brush, *p*, being applied to cover the aperture B and remove superfluous grain from the aperture in the slide when the latter is moved. For drilling small grain the machine is used with the full number of teeth and with all the slides in operation; but to adapt it for planting in distant rows the intermediate belts of teeth are removed and the apertures communicating therewith covered. For planting corn or other crops in hills some of the remaining teeth are removed or the slides thrown out of operation.

Two or more teeth may, if desired, be employed for each hill, so as to deposit as many separate grains at regular distances apart in each hill.

By withdrawing the temper-screws *g* the springs G may be unshipped, so as to throw the slides D out of operation or admit of their removal. Each slide may be provided with two sets of holes of different sizes, so as by turning them end for end to vary the quantity of seed deposited.

The cam F is constructed of such length that in planting corn one of the operating slides will be released and fly back at the instant that the next in succession deposits the seed, giving an audible indication, by means of which the operator is enabled to observe whether he is planting in straight rows, crosswise, and if not the machine is to be stopped, the levers I depressed so as to raise the cylinder, and the latter turned on its axis as may be needful.

The represented curved form of the tooth and the orifice in the end of its rear side cause it to deposit the seed in the extreme bottom of the cavity and leave the ground easily as the cylinder continues to rotate.

The following may be mentioned as beneficial features in the above-described apparatus: It will work successfully in newly-plowed ground and is not impeded by roots, clods, or trash, which form serious obstacles to the operation of many forms of seed-planters. The seed is all deposited at an equal depth beneath the surface, clods and stones being effectually excluded by the form of the tooth and of the cavity it produces. In any common soil a little finely-pulverized earth is crumbled down upon the seed; but if it be not covered at all it does not fail to germinate. The same machine is well adapted for planting all kinds of grain, large and small, and for planting either in hills or drills at any distance desired. It is found highly advantageous for planting small grain in hills for cultivation. It constitutes an effective roller and clod-crusher, and may be used for this purpose, either with or without seeding.

The following is what I claim as new and of my invention herein:

1. The construction and arrangement of the teeth E, when combined with a rotary seed-planter, as and for the purposes set forth.

2. The combination of the carriage A, levers I, rod J, catch K, and wheels H, in the manner and for the purposes set forth.

3. The arrangement of the slides D, springs G, and segmental cam F, constructed and operating in the manner and for the purposes set forth.

In testimony of which invention I hereunto set my hand.

LEONARD HARIMAN.

Witnesses:

J. W. SANSBERRY,

D. H. WATSON.